UNITED STATES PATENT OFFICE.

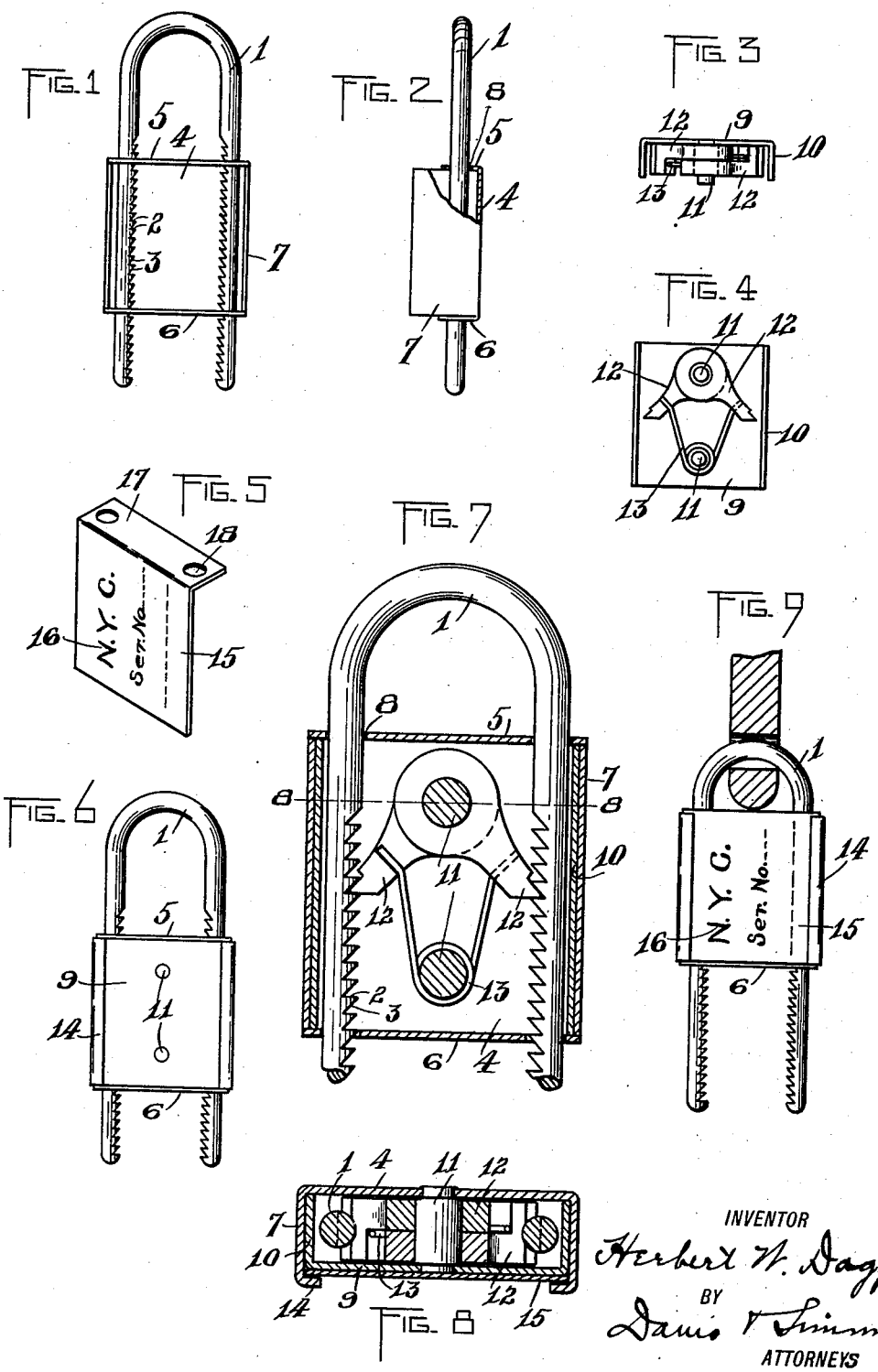
H. W. DAGGS.
SEAL LOCK
APPLICATION FILED NOV. 25, 1918.
1,313,270.
Patented Aug. 19, 1919.
INVENTOR
Herbert W. Daggs
BY
Davis & Simms
ATTORNEYS

HERBERT W. DAGGS, OF ROCHESTER, NEW YORK.

SEAL-LOCK.

1,313,270.   Specification of Letters Patent.   Patented Aug. 19, 1919.

Application filed November 25, 1918. Serial No. 263,958.

*To all whom it may concern:*

Be it known that I, HERBERT W. DAGGS, a citizen of the United States, and resident of Rochester, in the county of Monroe and State of New York, have invented certain new and useful Improvements in Seal-Locks, of which the following is a specification.

The present invention relates to seal locks and more particularly to the type in which a shackle interlocks with a casing in such a manner that a complete or partial destruction of a part of the seal is required in order to open the sealed structure, an object of this invention being to provide connection between the shackle and the casing which will permit that portion of the shackle which interlocks with the structure to be secured, to lie in close proximity to the casing of the seal in order that the introduction of a rod or other instrument between the latter and the seal casing for the purpose of breaking the seal, will be prevented.

Another object of the invention is to provide a casing which has openings in two opposite walls, the openings in one wall being alined with the openings in the other wall, in order that the arms of the shackle may be projected through both walls; and in this way such arms may be withdrawn from the casing of the seal if the shackle be cut at two points adjacent the connecting portion between the two arms, thus permitting the seal casing to be again employed with another shackle.

A further object of the invention is to provide a sealing device which would be held by the shackle to the casing and at the same time will be so arranged as to be readily inspected.

The invention consists of certain parts and combination of parts, all of which will be hereinafter described and more particularly pointed out in the appended claims.

In the drawings:—

Figure 1 is an inside view of one of the members of the seal casing showing the shackle associated therewith;

Fig. 2 is the side view of the casing member shown in Fig. 1 with the shackle associated therewith, a part of the casing being in section;

Fig. 3 is a top view of the other member of the casing, showing the shackle clutching means mounted thereon;

Fig. 4 is the inside view of the casing member shown in Fig. 3;

Fig. 5 is a perspective view of the sealing device employed in connection with the seal;

Fig. 6 is a front view of the seal with the sealing device removed therefrom and the shackle connected with the casing;

Fig. 7 is an enlarged section through the casing showing this shackle held by clutching means;

Fig. 8 is a section on the line 8—8 of Fig. 7;

Fig. 9 is a front view of the seal connected to a part to be sealed, the sealing being shown in position on the casing.

The seal comprises a shackle and a casing with which the shackle interlocks. The shackle 1 is preferably of a U shape and made in this instance from wire with the opposed faces of its two arms provided with a series of shoulders 2 to which lead inclined faces 3, these shoulders and faces being provided in order that a clutching means arranged within the casing will coöperate therewith to prevent the withdrawal of the shackle from the casing.

The casing in the illustrated embodiment is formed by two members; one being illustrated in Figs. 1 and 2 and the other section being illustrated in Figs. 3 and 4. The member illustrated in Figs. 1 and 2 has a rear wall 4, top and bottom walls 5 and 6 respectively and side walls 7. The top and bottom walls 5 and 6, are each provided with two openings 8, the openings in the top wall being alined with those in the bottom wall, so the arms of the shackle after passing through the opening of the top wall, may pass through the openings of the bottom wall in order that their free ends may project from the casing. The other casing member illustrated in Figs. 3 and 4, embodies a front wall 9 and the two side walls 10, which are secured between the side walls 7 of the first described casing member by pins 11 connecting the front wall 9 with the rear wall 4.

The casing of the seal contains clutching means for coöperation with the arms of the shackle. These means in this instance comprise two pawls 12, pivoted upon one of the pins 11, to provide a common axis and extending downwardly in the casing so that when the arms of the shackle 1 are introduced in the top wall, the pawls will not interfere with the movement of the shackle during the insertion but should an attempt be made to withdraw the shackle, the pawls will spread outwardly into binding engagement with the shoulders 2 of the shackle arms and thus prevent such withdrawal. A spring 13 may be coiled around the other pin 11 and have its arms connected to the two pawls 12, thus giving such pawls a tendency to move in outward directions.

With the purpose in view of connecting a sealing device with the seal, the front wall of the seal may be provided with two overhanging portions 14 spaced from the front wall of the casing, being in this instance formed by providing extensions on the side walls 7 of the first described casing member and bending such extensions over the front wall 9 in spaced relation to the latter.

The sealing device comprises in this instance, the main body portion 15 on which the identifying matter 16 is marked and a laterally turned portion 17 at one end of the body portion. This laterally turned portion being formed with two openings 18, so that when the body portion 15 of the sealing device is placed beneath the overhanging portions 14, the laterally turned portion 17 will abut the top wall 5 of the casing and the openings 18 in the said laterally turned portion will be in position to permit the arms of the shackle to be passed through said openings in order to interlock with the casing, thus securing the sealing device in position on the casing of the seal.

From the foregoing it will be seen that there has been provided a seal in which the shackle may be moved inwardly in the casing of the seal until a portion of the structure to be sealed is firmly secured between the top wall of the casing and that portion of the shackle which connects the arms of such shackle, thus preventing the introduction of a rod or bar between the shackle and the casing for the purpose of removing the casing from the shackle. The shackle at the same time holds the sealing device on the seal casing and the edges of the sealing device are protected by overhanging projections on the seal casing. The ends of the shackle project from the bottom of the seal casing and this permits the withdrawal of the shackle arms from the casing if the shackle be cut at two points adjacent to the end between the arms. This arrangement makes it possible for the seal casing, which is the most expensive part of the seal, to be used again and again; the only part of the seal that is destroyed being the shackle which may be inexpensively manufactured.

What I claim as my invention and desire to secure by Letters Patent is:—

1. A seal lock comprising a closed casing, a shackle, devices inclosed by the casing for holding the shackle therein, a sealing device separate from the casing and having two portions, one coöperating with the closed wall of the casing and another extending laterally therefrom and coöperating with that wall of the casing through which the shackle operates, said laterally extending portion having an opening through which a portion of the shackle passes, and overhanging inwardly turned retaining guides at opposite sides of the casing for engaging the edges of that portion of the sealing device which coöperates with the closed wall.

2. A seal lock comprising a casing having a top wall formed with openings, and a front wall provided with overhanging retainers, a U shaped shackle fitting through said openings in the top wall, and a sealing device removably held beneath such retainers and having a laterally turned portion arranged above the top of the casing and engaged by the shackle to hold the sealing device against removal from the casing.

3. A seal lock comprising two casing members rigidly secured together, one of said members being formed with a back wall, a top wall, a bottom wall and two side walls formed with inwardly turned extensions, and the other of said members being formed with a closed front wall and two side walls received within the side walls of the first named member, the inwardly turned extensions on the first named member overhanging the front wall of the first named member, but being spaced from such front wall to provide retainers for a sealing device, in combination with a shackle operating through the top wall of the first named member, and a sealing device received under the inwardly turned extensions and held by the shackle.

HERBERT W. DAGGS.

Copies of this patent may be obtained for five cents each, by addressing the "Commissioner of Patents, Washington, D. C."